Dec. 2, 1969   W. F. MUTTER ET AL   3,481,817
APPARATUS FOR ASSEMBLING CONTINUOUS TUBULAR ARTICLE
FROM TWO OR MORE CONTINUOUS PARTITUBULAR SECTIONS
Filed April 14, 1966   3 Sheets-Sheet 1
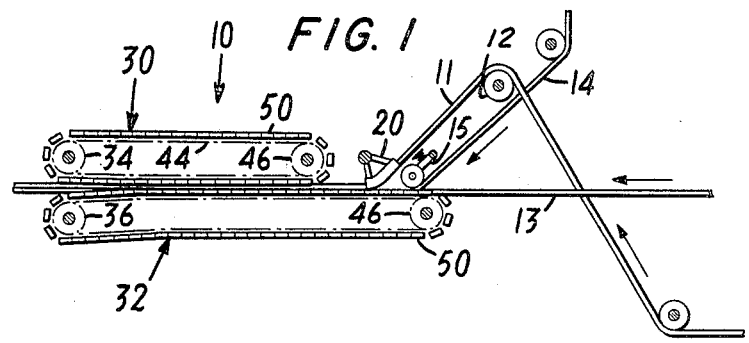
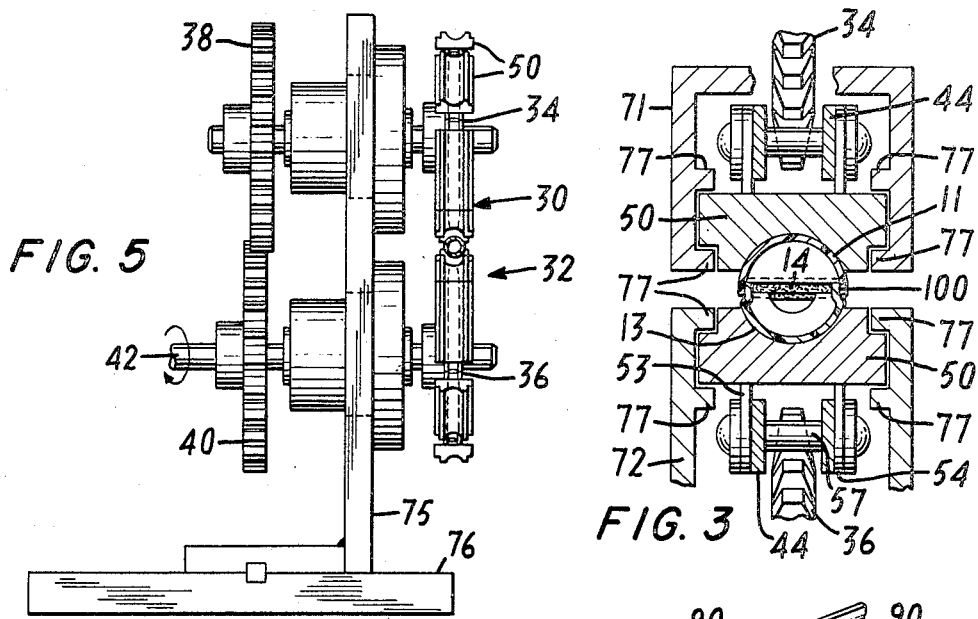
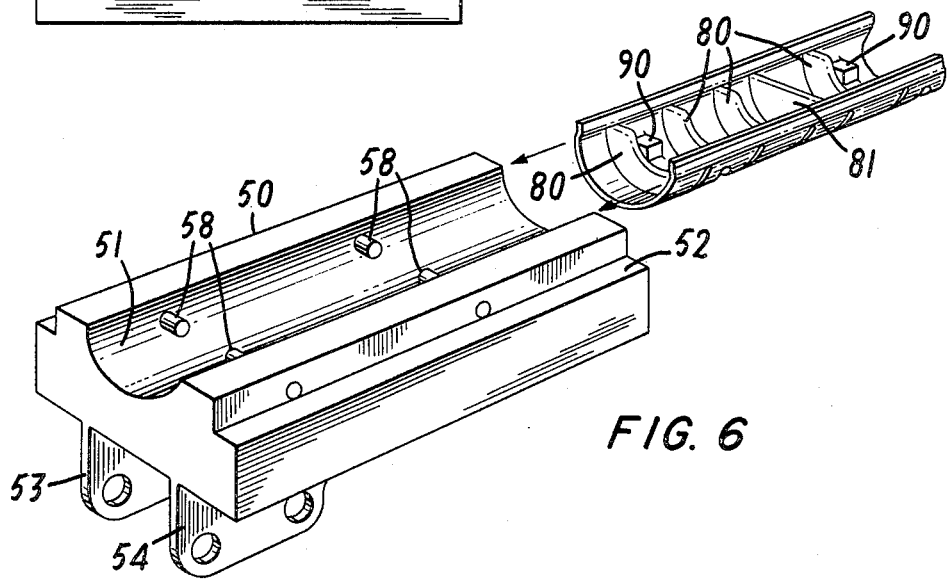

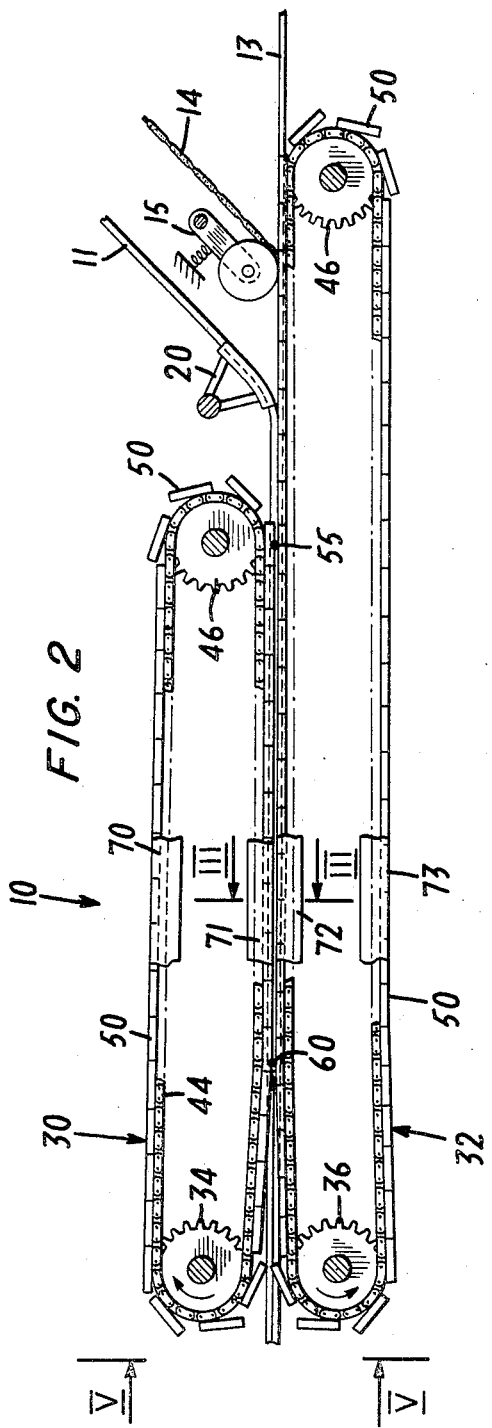
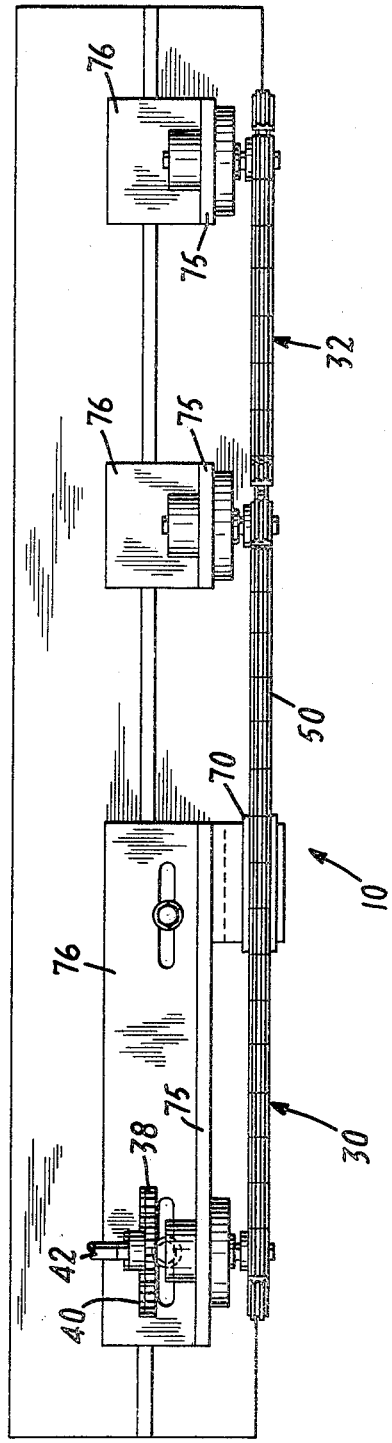

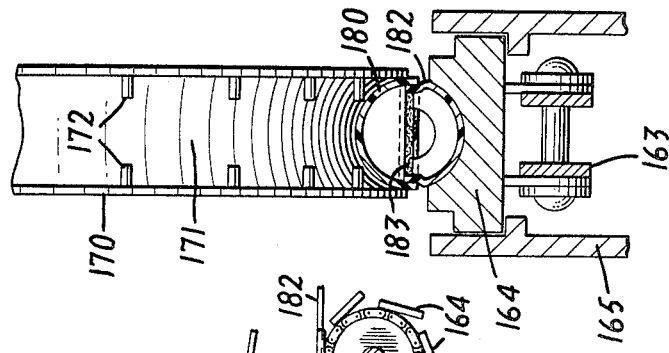
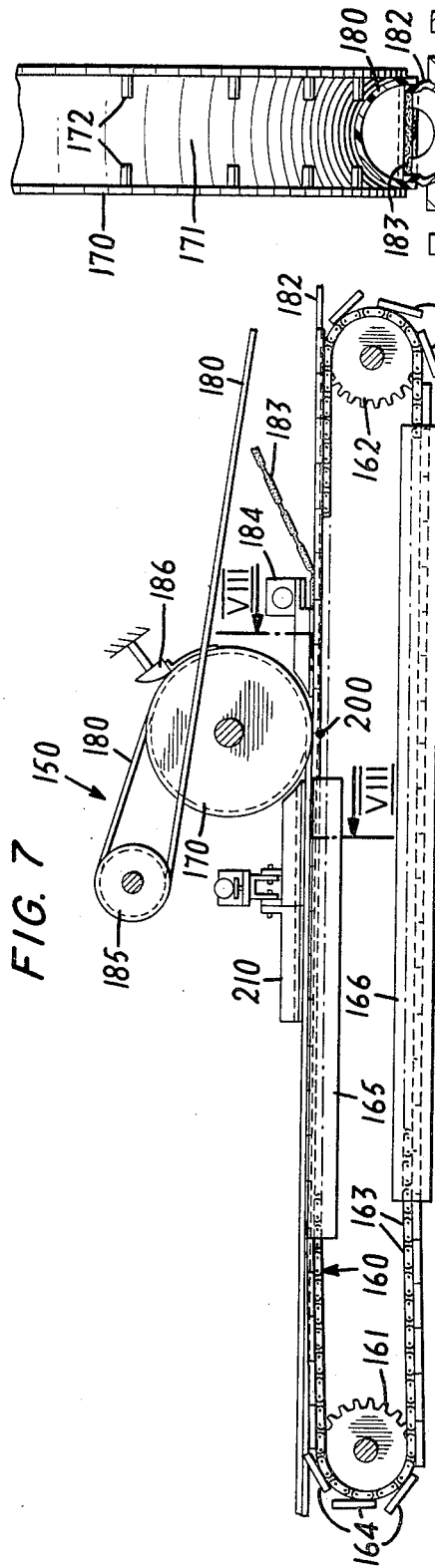

United States Patent Office 3,481,817
Patented Dec. 2, 1969

3,481,817
APPARATUS FOR ASSEMBLING CONTINUOUS TUBULAR ARTICLE FROM TWO OR MORE CONTINUOUS PARTITUBULAR SECTIONS
Walter F. Mutter and George L. Mathe, Richmond, Va., assignors to Philip Morris Incorporated, New York, N.Y., a corporation of Virginia
Filed Apr. 14, 1966, Ser. No. 542,517
Int. Cl. A24c 5/50
U.S. Cl. 156—383                                   1 Claim

ABSTRACT OF THE DISCLOSURE

Apparatus for assembling the continuous article comprised of two interfitting continuous bodies is disclosed. It includes first and second endless chain assemblies supported such that each have a straight run coextensive and parallel with a like straight run of the other. A plurality of blocks comprising a block train is mounted on each chain assembly, the blocks aligning during the coextensive straight runs to provide surfaces for receiving the continuous bodies with the lateral spacing between the block trains during the straight runs being substantially equal to the outside dimension of the continuous articles whereby the two bodies are forced into interfitting assembly.

---

This invention relates to apparatus for assembling two or more continuous partitubular shell sections to form a continuous tubular article.

The apparatus of the present invention is in general suited for use in assembling two or more continuous shaped bodies which interfit to form a continuous fabricated article as for example, a continuous tube. It is particularly useful for assembling a continuous fabricated cigarette filter rod, being utilized as part of the system apparatus described in the patent application of Wesley S. Larson et al., entitled "Manufacture of Continuous Tubular Article," Ser. No. 542,518, filed Apr. 14, 1966.

The mentioned patent application describes the manner in which a continuous cigarete filter rod is fabricated, the two partitubular sections which, when fitted together, constitute the rod being first shaped in a single continuous strip of moldable material. The sections are thereafter severed from the single shaped strip and further processed with respect to trimming residue, applying adhesive to one and ultimately are brought together at an assembling station at which point a continuous strip of filter material is fed longitudinally intermediate the two sections just before actual assembly thereof.

In accordance with the present invention the apparatus with which the sections are assembled is a conveyor-assembler which may embody a pair of chain assemblies arranged to have each a straight portion of run which is coextensive with the run of the other. The chain assemblies are powered by a suitable drive means and each are provided with a plurality or train of blocks, the blocks on one chain registering with the blocks on the other at least during the coextensive straight runs thereof. The two shell sections which comprise the continuous article are led into the conveyor-assembler in a converging path being properly oriented one respectively with the other so that when asesmbled they will constitute a continuous hollow article. The sections are fed onto the block members of each chain assembly at the beginning of the straight run thereof. The chain assemblies are arranged such that during the straight runs thereof the trains of blocks are spaced apart at a distance substantially equal to the outside dimension of the tubular article. Thus the trains of blocks force the shell sections into a interfitting assembly.

A modified form of the invention provides that one of the chain assemblies may be replaced with a registration wheel mounted to rotate in a plane coincident with the travel of the other chain assembly. The periphery of the registration wheel is concave grooved so as to receive one of the shell sections. Thus in the course of the rotative travel of the wheel adjacent said other chain assembly, it directs the shell section thereon into interfitting assembly with the shell section carried on the chain assembly.

The invention includes other novel features including means for effecting specific longitudinal alignment between the respective shell sections as they are being assembled.

Further objects and advantages will become apparent from a consideration of representative embodiments of the principles of the invention to be described. The invention accordingly comprises the features of construction, combination of elements, and arrangement of parts, which will be exemplified in the construction hereinafter set forth and the scope of the invention will be indicated in the claim.

Reference should be had to the following detailed description taken in conjunction with the accompanying drawings in which:

FIGURE 1 is a generally schematic representation in front elevation of one embodiment of the apparatus of the present invention as it may be used for assembling two continuous shell sections to form a continuous tubular article.

FIGURE 2 is a front elevational view similar to FIGURE 1 but on enlarged scale.

FIGURE 3 is a sectional view as taken along the line III—III in FIGURE 2.

FIGURE 4 is a top plan view of the conveyor assembler shown in FIGURE 2.

FIGURE 5 is an end elevational view as taken along the line V—V in FIGURE 2.

FIGURE 6 is a perspective view of one of the blocks used in the train of blocks on each chain assembly of the apparatus of FIGURE 1 and illustrates the registration pins carried in each block which engage companion indentations in the shell sections being assembled to insure proper longitudinal registration of the shell sections one with the other.

FIGURE 7 is a side elevational view of a modified form of the apparatus wherein a single chain assembly and registration wheel are utilized for assembling the shell sections.

FIGURE 8 is a sectional view as taken along the line VIII—VIII in FIGURE 7.

Throughout the description like reference numerals are used to denote like parts in the drawings.

The apparatus of the present invention is disclosed herein in representative embodiments as being used for assembling two continuous partitubular shell sections to form a continuous tubular article. It should be understood, however, that the apparatus has a more general utility and can be used for assembling continuous articles formed from two or more continuous bodies irrespective of the surface shape of the bodies and including both thin walled and solid bodies and combinations thereof. As used herein "interfitting" is intended to denote continuous bodies which are adapted to interfit with each other to form a continuous assembled structure.

An overall system in which the conveyor-assembler of the present invention may be used is described in detail in the aforementioned patent application of Wesley S. Larson et al. In that system, a continuous strip of moldable material is advanced onto a rotating forming wheel whereon the two partitubular shell sections which comprise the ultimate continuous article are shaped longitudinally in the strip. The strip is then led off the forming wheel and severed into the two longitudinal sections, the sections then being trimmed, an adhesive applied to the edges of one and the two sections then advanced toward the assembly station, one of the sections being inverted 180° so as to facilitate bringing it into juxtaposed open face-to-face relation with the other section just prior to actual assembly.

At that point in the fabrication process, the two shell sections are ready to enter the conveyor-assembler 10 in the manner generally shown in FIGURES 1 and 2. Referring in detail to FIGURES 1 and 2, the upper shell section 11 which may be termed by way of convenience as a "female section" inasmuch as the two shell sections are intended to interfit with a male and female joint means as generally denoted at 100 in FIGURE 3, is directed over a roller means 12 and downwardly towards and passes under a guide assembly 20. The other continuous section 13 which by way of convenience is termed a "male section," proceeds along in the generally straight run as shown having been oriented (by means not shown) from a concave outer surface up to a concave outer surface down position so that its open face will be opposed to that of the female section 11. Simultaneous with the first entry of male section 13 onto the conveyor-assembler 10 as seen in FIGURE 1, there is inserted therein a continuous strip of filter material 14 which is fed longitudinally intermediate the converging shell sections, the filter material 14 being firmly inserted in the male section 13 by means of a resiliently supported presser device 15.

The specific details of construction of the conveyor-assembler 10 will not be described. It includes an upper chain assembly 30 and a lower chain assembly 32, the lower chain assembly it will be noted, having a longer total run than that of the upper chain assembly. The chain assemblies 30, 32 each are driven by suitable counter-rotating sprockets 34, 36, respectively, the sprockets being of the same diameters and connected as shown in FIGURE 5 with pinion gears 38 and 40 respectively, which are driven from a common power shaft 42. Idler pulleys 46 also are provided for each chain assembly. The pinion gears 38 and 40 are also of equal diameter and therefore the line speed of each chain assembly is the same. The chain assemblies 30, 32 comprise each a plurality of links 44 of conventional construction each of which carry a block 50 of the construction illustrated in FIGURE 6. As may be seen in FIGURE 2, the chain assemblies 30, 32 are supported in a manner as will be described so as to have a coextensive straight run between the two points generally indicated at 55 and 60. The blocks on the chain assemblies between said points thus present contiguous shell section engaging means or surfaces as will appear. Moreover, the blocks on one chain assembly as for example, upper chain assembly 30, are arranged such that during the straight run between points 55 and 60 they move along in opposed longitudinal alignment with a companion block on the other chain assembly. The lateral spacing of the respective trains of blocks on each chain assembly during the straight run between points 55 and 60 is substantially equal to the outside dimension of the assembled tubular article. In this manner, the male and female sections 13 and 11 are forced into interfitting relation, the fully assembled condition thereof being best seen in section in FIGURE 3. It is during the period of the travel of the assembled article between points 55 and 60, that the adhesive applied to the female joint means may be activated to effect an adhesive connection between the shell sections.

The blocks 50 mounted on the respective chain assemblies are provided with longitudinal grooves as at 51, the grooves being generally concave in section to correspond with the particylindrical outer surface configuration of the shell sections 11 and 13. However, it will be apparent to those skilled in the art that the groove configuration of the blocks may be varied to conform same to the section shape of articles having a wide range of outer surface configurations including oval, square, trapezoidal, etc. The blocks 50 are provided with a pair of connector arms 53, 54 for attaching the blocks to the chain links 44, the arms having holes through which pass the chain link connector pins 57 (FIG. 3).

As the chain assemblies 30, 32 traverse their respective courses of travel it is preferable to provide support and/or guide structures to obviate undue flexure in the chain elements. Obviously this is particularly desirable during the time the blocks 50 are in contact with the assembled tubular article, viz, between points 55 and 60. This supporting structure may be best seen in FIGURES 2, 3, 4 and 5 wherein it will be noted it may include a number of separate guide tracks 70–73, associated with the forward and return travel straight courses of the two chain assemblies. The guide tracks may be connected with suitable upright members 75 mounted on base members 76 as shown in FIGURES 4 and 5. The guide tracks function generally to maintain the chain assembly blocks 50 in planar alignment during the major course of travel. Thus, the guide tracks 71 and 72 provide that the blocks 50 in the chain assemblies 30, 32 have straight, uniformly, laterally spaced runs between points 55 and 60, and constitute contiguous, straight shell sections engaging and supporting means. The structural shapes shown in FIGURE 3 are representative of the construction of the various guide tracks. Thus, the guide tracks 71 and 72 have transverse shoulders 77 arranged in opposed pairs on which the blocks 50 ride, the blocks having slotted margins as at 52 conforming to the shape of the shoulders 77. The friction generated by the travel of the blocks along the guide tracks may be minimized by coating the track surfaces with a layer of antifriction material, as for example, Teflon.

An important feature of the invention is that as the chain assemblies 30, 32 rotate, they are controlled to operate at equal line speeds and are adapted to have the blocks 50 of one register longitudinally during the straight run between points 55 and 60 with a companion block in the other. The purpose of providing this registration is to effect a specific longitudinal alignment between the male and female shell sections 13 and 11. As described in the aforementioned Larson et al. patent application, the respective cigarette filter rod sections are each provided with internal ribs 80 and smoke barriers 81 which when assembling the filter rod must be aligned in specific relation with each other. Only one shell section 11 is shown for convenience in FIGURE 6 but it will be apparent that the other is of identical construction. Unless proper registration is maintained between the shell sections, the repeating pattern of ribs 80 and smoke barriers 81 in one section will not match in the intended manner with those in the other and the ultimate assembled article when cut into individual cigarette filter lengths will be unsuitable for the purpose intended. The construction of the cigarette filter rod as disclosed in the aforementioned patent application is such that proper longitudinal alignment of the respective shell sections 11 and 13 involves axially aligning the smoke barriers 81 of one with a designated supporting rib 80 in the other. To insure that this proper registration of the respective sections occurs, the shell sections 11 and 13 are formed with inwardly directed shoulders or indentations 90 as shown in FIGURE 6, these shoulders being of a repeating pattern. As the shell sections enter the conveyor-assembler onto the blocks 50 of the respective chain assemblies, the registration pins 58 provided on each block engage the indentations 90 in the shell sections bringing them into the intended longitudinal alignment.

Further understanding of the invention will appear from a brief description of the manner of operation thereof. The properly oriented male section is first advanced onto the train of blocks 50 of chain assembly 32, the latter being of greater overall length than chain assembly 30 to facilitate inserting the continuous filter strip 14 therein with the preser device 15. The subassembly represented by the filter strip and male shell section is then conveyed onwardly and the female section 11 led in converging course therewith under guide assembly 20. The guide assembly does not however, effect any longitudinal alignment or interfitting assembly between the shell sections. This is accomplished only when the female shell section advances onto the blocks 50 of the upper chain assembly 30 as occurs at 55. At this point the shell sections are forced together laterally and the longitudinal alignment therebetween effected. The shell sections 11 and 13 are maintained under this assembly action until point 60 is reached from whence the chain assemblies start to diverge as shown, the fully assembled filter rod thereafter being advanced to a cutting station at which it is severed into lengths of predetermined measure in known manner.

The conveyor-assembler 150 shown in FIGURES 7 and 8 differs from that previously described in that it includes a lower chain assembly 160 and a registration wheel 170 instead of an upper chain assembly. The lower chain assembly 160 rides around a powered sprocket 161 and an idler sprocket 162 as shown, and comprises a plurality of links 163 each of which carry a block 164, the latter being of the same construction as the blocks 50 described earlier herein. As will be noted, the chain assembly 160 has substantially straight upper and lower courses along which may extend guide tracks 165 and 166, respectively, the latter serving the same function as the guide tracks of the apparatus embodiment hereinbefore described. Registration wheel 170 is a power driven member supported for rotation in a plane coincident with the travel of the lower chain assembly 160 and is provided with a concave peripheral face 171 as best seen in FIGURE 8 to adapt the wheel for receiving the convex outer surface of a "female" shell section 180 as will be described. The registration wheel 170 also is provided at each side thereof with uniformly, circumferentially spaced registration pins 172, the registration pins extending transversely inwardly of the sides and functioning as will appear.

The operation of the conveyor-assembler 150 will now be described. A "male" shell section 182 is advanced, convex outer surface down onto the train of blocks 164 of lower chain assembly 160. A little distance down the line therefrom, a continuous filter strip 183 is directed under a seating block 184 being inserted thereby into the male shell section. At the same time the female shell section 180 is directed over the lower chain assembly 160, around a lead-in pulley 184 and onto the registration wheel 170, the female shell section passing under a lead-in block 186 which inserts the shell section securely into the grooved periphery of the registration wheel. The lead-in block 186 may be supported adjacent the wheel by a suitable support means (not shown). The female shell section is first lead onto the registration wheel in such manner that the registration pins on the wheel will engage in shoulders 90 (FIG. 6) formed in the shell section, the registration pins being circumferentially spaced around the wheel a distance equal to the longitudinal spacing of adjacent shoulders in the shell section. Moreover, the registration wheel 170 is rotated at a requisite RPM to give the wheel a peripheral speed equal to that of the line speed of the lower chain assembly. Inasmuch as the lower chain assembly blocks 164 are provided with registration pins, the desired longitudinal alignment between the two shell sections may be easily effected. As the registration wheel rotates, it passes through its point of closest adjacency to the lower chain assembly at 200, a distance about 120° from the lead-in block 186. At the latter location 200, the shell sections are brought into interfitting assembly with the female shell section passing off the registration wheel. The assembled filter rod then passes under a stabilizer device 210 which maintains the shell sections in assembled condition during the time a permanent connection therebetween is being effected, as for example, activating an adhesive previously applied to one or both of the shell section interfitting surfaces.

The apparatus of FIGURES 7 and 8 is advantageously employed when it is desired to have more accessibility for inserting additional articles within the rod structure as for example, pills, powder granules, etc.

What is claimed is:

1. Apparatus for joining two semitubular sections having interfitting edge surfaces to form a tubular article, such as cigarette filter rod, said sections also having indentations therein at longitudinally spaced locations, said apparatus comprising two conveyors each of which includes an endless chain, trains of blocks mounted on each endless chain, said blocks each having a concave groove therein, said chains having coextensive, parallel straight run paths in which the blocks in each train face each other with the grooves therein juxtaposed at a distance equal to the outside dimension of the tubular article so as to position sections held on such trains in edge to edge juxtaposition and force said sections into interfitting assembly, guide track means associated with each conveyor, the blocks in each train further having shoulders at their sides engaged with said guide track means for maintaining the spacing between the block trains during the straight run travel of said chains, and alignment pins carried on each block for engaging the indentations in said sections to prevent relative longitudinal movement between the two sections.

References Cited

UNITED STATES PATENTS

| 3,235,429 | 2/1966 | Boggs | 156—544 XR |
| 3,394,713 | 7/1968 | Thomson et al. | 131—210 XR |
| 3,323,274 | 6/1967 | Justus | 156—292 XR |
| 3,302,278 | 2/1967 | Whitney | 29—200 XR |
| 3,189,505 | 6/1965 | Sloan et al. | 156—292 XR |
| 3,170,581 | 2/1965 | Temple | 214—309 |
| 2,912,043 | 11/1959 | Bargholtz et al. | 156—292 XR |
| 2,670,885 | 3/1954 | Allen. | |
| 2,329,938 | 9/1943 | Ortiz | 29—463 |
| 1,949,984 | 3/1934 | Walker | 29—463 |
| 1,619,387 | 3/1927 | Waugh | 131—264 |

FOREIGN PATENTS 965,034   7/1964   Great Britain.

HAROLD ANSHER, Primary Examiner

G. W. MOXON II, Assistant Examiner

U.S. Cl. X.R.

29—200, 463; 156—303.1, 544; 198—162